United States Patent [19]
Wilkerson

[11] Patent Number: 4,549,763
[45] Date of Patent: Oct. 29, 1985

[54] TRANSPORTATION SEAT WITH VANDAL-RESISTANT GRABRAIL

[75] Inventor: Larry A. Wilkerson, Comstock Park, Mich.

[73] Assignee: American Seating Company, Grand Rapids, Mich.

[21] Appl. No.: 576,197

[22] Filed: Feb. 4, 1984

Related U.S. Application Data

[63] Continuation of Ser. No. 295,681, Aug. 24, 1981, abandoned.

[51] Int. Cl.$^4$ ................................................ A47C 4/52
[52] U.S. Cl. ..................................... 297/183; 16/125; 248/251; 297/250
[58] Field of Search ............... 297/183, 450, 396, 487, 297/488, 216, 250; 280/751, 748, 181; 296/71; 4/604; 248/251; 256/21, 22, 24, 59, 65; 16/111 R, 110 R, 114 R, 125

[56] References Cited

U.S. PATENT DOCUMENTS

| | | | |
|---|---|---|---|
| 793,863 | 7/1905 | Vogel | 297/183 |
| 3,145,050 | 8/1964 | Edwards | 297/183 |
| 3,766,598 | 10/1973 | Roberts | 16/125 |
| 3,825,229 | 7/1974 | Bartlett | 248/251 X |
| 3,836,068 | 9/1974 | Schwarzkopf | 16/125 |
| 4,106,810 | 8/1978 | Barecki | 280/751 |

FOREIGN PATENT DOCUMENTS

| | | | |
|---|---|---|---|
| 2856174 | 7/1980 | Fed. Rep. of Germany | 16/111 R |
| 2314842 | 1/1977 | France | 297/183 |

Primary Examiner—James T. McCall
Attorney, Agent, or Firm—John A. Waters

[57] ABSTRACT

A seat for mass transportation vehicles includes a bench portion, a back portion and an elongated impact energy absorbing grabrail extending along the upper edge of the back portion. The grabrail is molded as an integral, one-piece member from a plastic material. The grabrail includes an elongated base member having an aisle end and a wall end. The base member defines a plurality of longitudinally spaced attachment apertures. Suitable fasteners extend through these apertures to secure the grabrail to the upper edge of the back portion of the seat. A rail portion is formed integral with the base portion and extends therefrom. The rail portion includes legs which are joined to the upper surface of the base portion. The grabrail is essentially solid and has a transverse cross section in the shape of a polygon. The grabrail resists cutting by vandals and deflects on impact to absorb energy and compartmentalize passengers in the vehicle.

7 Claims, 6 Drawing Figures

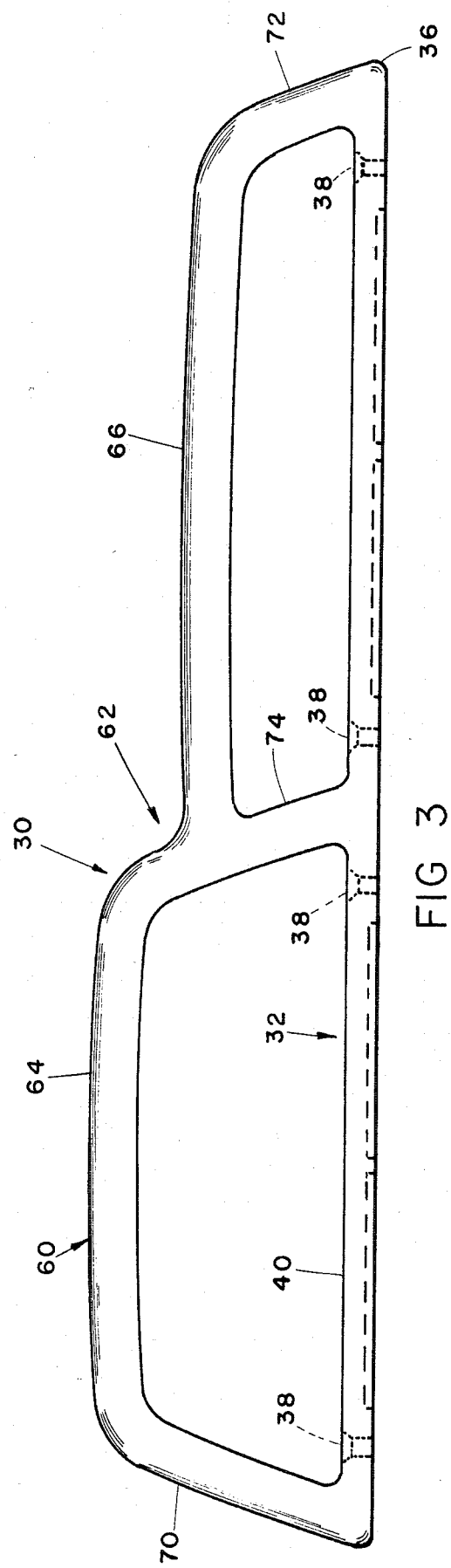
FIG 3
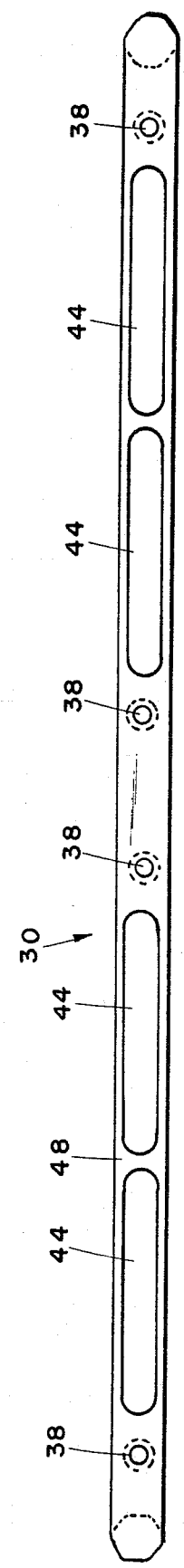
FIG 4
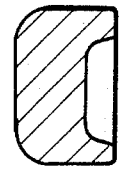
FIG 6
FIG 5

TRANSPORTATION SEAT WITH VANDAL-RESISTANT GRABRAIL

This is a continuation of application Ser. No. 295,681 filed Aug. 24, 1981 now abandoned.

BACKGROUND OF THE INVENTION

The present invention relates to transportation seating for mass transit vehicles, such as intra and intercity buses, trains, subways and the like. More particularly, the invention relates to such mass transportation seating which includes a grabrail.

Heretofore, a fairly wide variety of seating configurations have been provided or proposed for mass transportation vehicles. Such multipassenger seating typically includes a frame or a structural member which defines seat and back portions. The seat and back portions may be covered by various materials, such as fiberglass, foam, cushioning and the like.

Transportation seats may include grabrails at the upper edge of the back portion. Grabrails perform multiple functions. For example, they assist passengers in entering or leaving the seat and provide a handhold for passengers standing in the aisle portion of the vehicle. Examples of previous mass transportation seats which incorporate grabrails may be found in U.S. Pat. No. 3,737,198, entitled RAPID TRANSIT SEATING and issued on June 5, 1973, to Barecki et al; U.S. Pat. No. 3,747,979, entitled CANTILEVERED SEAT FOR MOTOR COACH VEHICLES OR THE LIKE and issued on July 24, 1973, to Barecki; and U.S. Pat. No. 3,802,738, entitled CANTILEVERED SEAT and issued on April 9, 1974, to Tantlinger. The seats disclosed in these above patents employ tubular frame structures. The grabrails are secured to or inserted into the tubular frame members.

Grabrails, besides providing assistance to passengers, perform additional important functions. Grabrails which extend above the top portion of the seat serve to compartmentalize passengers in an impact situation. The passenger who is thrown forward during an impact will strike the grabrail with his head or upper body portion. This prevents the passenger from flying over the seat in front of him. Since grabrails are in a zone which could be contacted by the head of the passenger and can serve the compartmentalization function, certain standards have been adopted relating to the energy absorption characteristics of the grabrails. It is desirable that the grabrail absorb impact energy so as to reduce the deceleration forces imparted to the body portion which contacts the rail.

Various proposals have been made to provide an energy absorbing grabrail in mass transportation seating. Examples of such prior approaches may be found in U.S. Pat. No. 4,106,810, entitled GRABRAIL FOR TRANSIT VEHICLE SEATS and issued on Aug. 15, 1978, to Barecki; and U.S. Pat. No. 4,077,664, entitled SEAT WITH CUSHIONED GRABRAIL and issued on Mar. 7, 1978, to Harder. The grabrails exemplified by these patents incorporate a tubular core structure which is covered with a cushionable material.

The grabrail disclosed in U.S. Pat. No. 4,106,810 includes a rectangular, steel tubular member and a surrounding self-skinning urethane foam. The ends of the grabrail are secured to the uprights of the seat frame through suitable fasteners. The grabrail exhibits excellent energy absorption characteristics.

The grabrail disclosed in U.S. Pat. No. 4,077,664 incorporates a circular, metal tubular inner member which is surrounded or enclosed by an outer layer of resilient cushioning material. The grabrail includes depending end legs which are inserted into frame uprights of the seat back structure and secured by fasteners. The seat frame structure is covered by a plastic seat shell. To accommodate the grab bar, a top flange of the seat shell must be cut away to permit insertion of the grabrail and assembly to the seat.

Various problems have been experienced in the transit industry with respect to prior grabrail structures. The grabrails which have been covered with a resilient or cushionable material are subject to vandalism. The material may be cut, slashed or ripped. This vandalism, of course, necessitates repair or replacement of the grabrail. Since grabrail structures are typically inserted into frame portions of the seat, partial disassembly of the seat may be necessary to remove the grabrail. Further, the prior approaches to grabrail constructions, as mentioned above, have generally required cutting or notching of the seat to accommodate the rail.

A need exists for a transportation seat and grabrail which is resistant or immune to vandalism, which is easily secured to the seat, which eliminates the need for notching or cutting of the seat shell, which is easy to maintain and clean, and which has energy absorption characteristics.

SUMMARY OF THE INVENTION

In accordance with the present invention, a unique grabrail and transportation seat are provided whereby the aforementioned needs are substantially fulfilled. Essentially, a vandal-resistant and energy absorbing grabrail is provided which is securable to an upper edge of the back portion of the transportation seat. The grabrail includes an elongated base which extends substantially the length of the seat back. A plurality of spaced apertures or throughbores extend between upper and lower surfaces of the base. Suitable fasteners may extend through these apertures to secure the grabrail to the top edge of the seat. A top rail portion extends from the upper surface of the base. The top rail portion includes legs which are joined integrally to the base member. The base and top rail portions are preferably formed as an integral one-piece member from a suitable thermoplastic material.

In narrower aspects of the invention, the rail portion includes an intermediate leg which joins the rail to the base intermediate the aisle and wall ends of the base. The rail portion has a six-sided transverse cross-sectional shape, and the base portion has a generally rectangular shape in transverse cross section with no sharp corners to reduce injury in a crash situation.

The multipoint attachment of the grabrail to the seat back distributes impact loading over a fairly large area. The grabrail is capable of deflecting upon impact to absorb energy and therefore reduce deceleration forces imparted to the passenger. The grabrail, which is preferably molded from a thermoplastic material, is resistant to vandalism. The material is not readily cut, slashed or sliced. Further, the grabrail is easily maintained due to its high level of stain and mark resistance. The rail may be cleaned with tough cleaners without degradation. The grabrail is readily assembled to the seat back since the fasteners enter the apertures from above. There is no need to cut, notch or remove portions of the seat in order to secure or remove the grabrail from the back portion. This represents a significant advantage in ease of assembly and reduction in problems of manufacture and seat design. The grabrail, due to its construction, may be made aesthetically pleasing and may be fabricated in a wide variety of colors to match the particular vehicle interior design. Should replacement of the grabrail become necessary, it is readily removed from the seat by using tools not normally accessible to vandals.

BRIEF DESCRIPTION OF THE DRAWINGS

FIG. 3 is an enlarged, front elevational view of the grabrail;

FIG. 4 is a bottom, plan view of the grabrail;

FIG. 5 is a cross-sectional view taken generally along line V—V of FIG. 3; and

FIG. 6 is a cross-sectional view taken generally along line VI—VI of FIG. 3.

DETAILED DESCRIPTION OF THE PREFERRED EMBODIMENT

Figure 1:
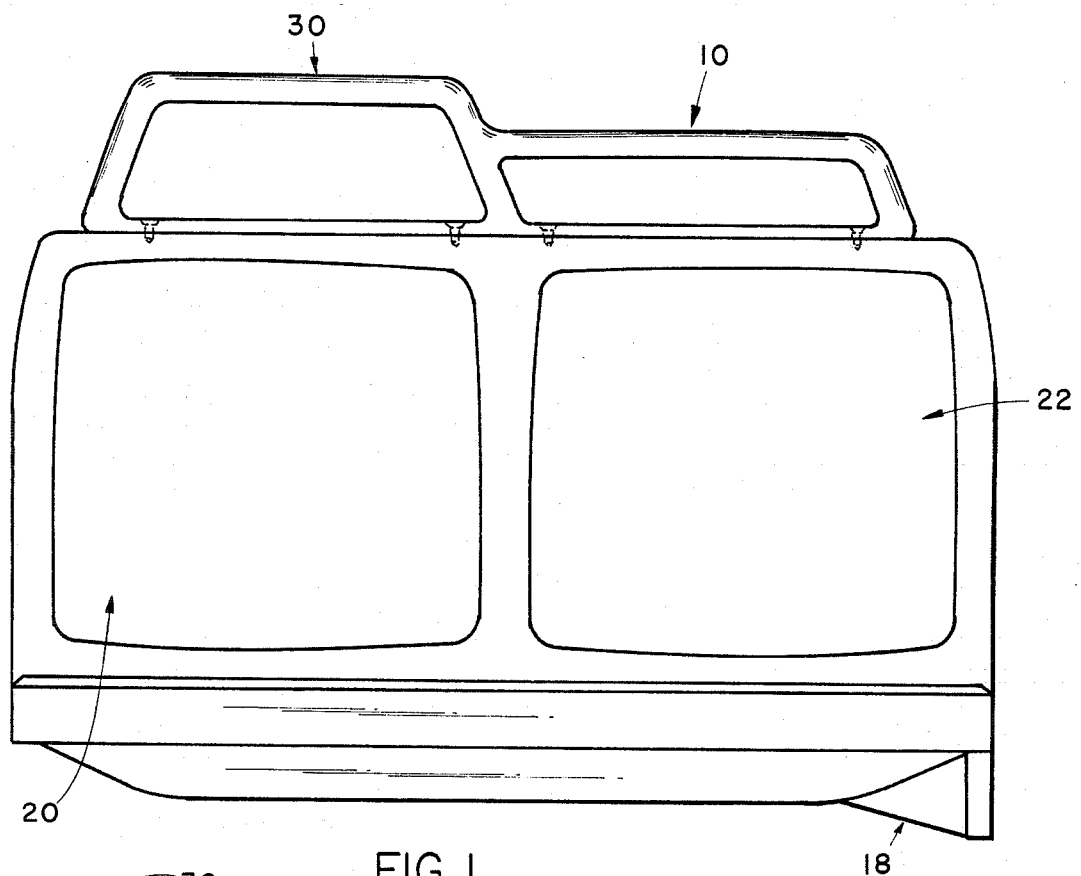
FIG. 1 is a front, elevational view of a mass transportation seat including a grabrail in accordance with the present invention.
Figure 2:
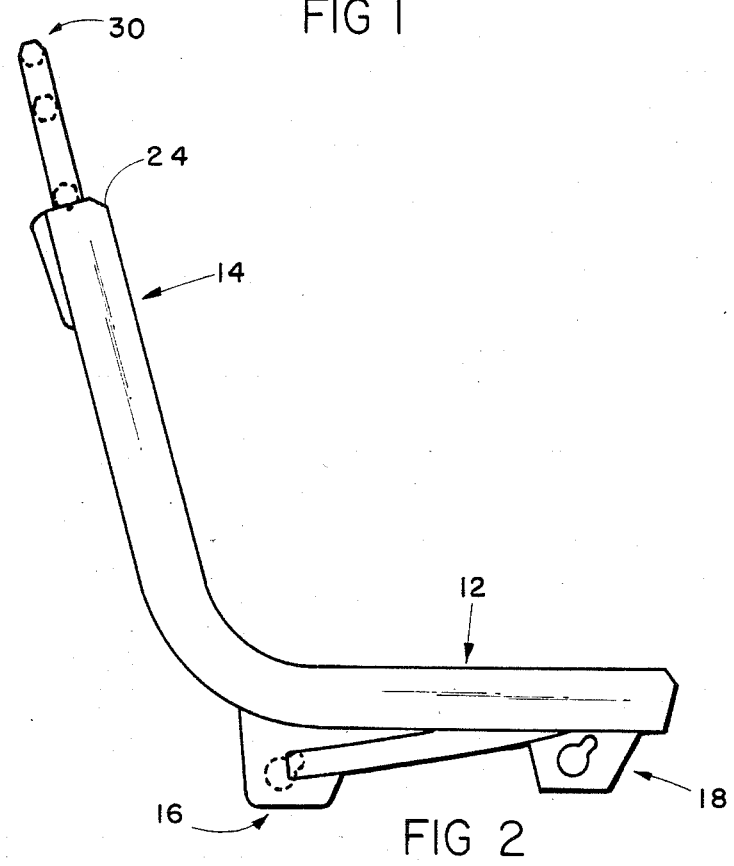
FIG. 2 is an aisle, side elevational view of the seat of FIG. 1.

A mass transportation seat in accordance with the present invention is illustrated in FIGS. 1 and 2 and generally designated 10. Seat 10 includes a bench portion 12 which is joined to an angled back portion 14. Seat 10 includes suitable brackets 16, 18 secured to the undersurface of bench portion 12. Brackets 16, 18 are adapted to mount the seat 10 from a wall in the vehicle in a cantilevered fashion. Seat 10 may include tubular frame members defining the bench portion and back portion. The tubular frame members may be covered by a suitable material, such as fiberglass pieces which enclose the frame and define the multiple seating positions 20, 22 (FIG. 1). Depending upon the use to which the seat would be put, the seating positions may be covered by suitable cushioning material.

The seat 10 would include a structural member extending across an upper edge or surface 24. If the seat is of tubular frame construction, this structural member would be a tubular steel or other metal piece. In the alternative, the seat could be fabricated from a structural plastic or foam material. In such case, internal metal reinforcement or tubular frame members may or may not be employed, depending upon the specific seat design.

Secured to upper edge 24 of the seat is a grabrail generally designated 30. As seen in FIGS. 1 and 2, the grabrail extends upwardly from the upper edge or surface 24 of the seat back and provides a handhold to assist passengers in entry or egress. The seat also provides a "barrier" which would prevent a passenger thrown forward from passing over the top of the seat. The grabrail is in a head impact zone.

Grabrail 30, as best seen in FIGS. 3 and 4, includes an elongated base portion or member 32. Member 32 includes an aisle end 34 and a wall end 36. As shown, a plurality of apertures or throughbores 38 extend between upper and lower surfaces 40, 42, respectively, of base 32. One of the apertures is positioned closely adjacent the aisle end 34. Another aperture is positioned closely adjacent the wall end 36. The remaining apertures, which in the preferred embodiment are four in number, are positioned on opposite sides of the transverse centerline of base 32. As shown in FIG. 3, it is preferred that the fastening apertures 38 be countersunk. As illustrated in FIG. 1, the rail may then be secured to the seat back by flathead recessed socket screws 43 which are flush with the upper surface 40 of the base portion.

Base 32, as seen in FIGS. 3, 4 and 6, defines a plurality of elongated recesses 44 which open through bottom surface 42. The base member throughout the length of each of the recesses 44, therefore, has a generally channel-shaped configuration in transverse cross section. The recesses extend only a short distance towards the upper surface 40 so that the base member is essentially solid or void free, as shown in FIG. 6. Recesses 44 are positioned in pairs and in tandem or end-to-end relationship. Each pair is separated by a bridging portion 48. The recesses extend between the aisle or wall end apertures 38 and the intermediate fastener apertures 38.

Extending from upper surface 40 of base 32 and formed integral therewith is a rail portion generally designated 60. Rail portion 60 includes an upper elongated portion 62 including a first or aisle section 64 and a second or wall section 66. An aisle leg 70 and a wall leg 72 are joined to portion 62 of the rail. The legs are integral with base 32 at its respective aisle and wall ends. In the preferred form, the rail portion further includes an intermediate leg 74 which joins the upper rail 62 to base 32 intermediate the ends of the base. As seen in FIG. 3, a fastening aperture 38 is positioned closely adjacent intermediate leg 74 on opposite sides thereof. Section 64 and leg 74 have a U shape, and section 66 and leg 72 have an L shape. As seen in FIG. 5, the rail portion 60 has the transverse cross-sectional shape of a six-sided polygon. The rail portion is also solid in cross section.

The configuration of the rail portion and the base portion, as well as their integral construction, permit the grabrail to deflect upon impact to absorb energy and reduce the deceleration loads which are imparted to the impacting body portion. The multipoint attachment, which in the preferred construction employs at least four attachment points, insures that impact loading is distributed over a wide area throughout most of the length of the base. This insures that the grabrail will remain secured to the seat back. The grabrail, when joined to the seat back, performs a barrier or compartmentalization function, as well as providing assistance to passengers. As shown, aisle portion 64 of the rail has a height dimension greater than the wall portion 66. This places the grabrail in a more convenient position for passengers who are standing in the aisle on a mass transit or intracity vehicle.

In order to obtain the desired energy absorption characteristics, resistance to vandalism and maintenance characteristics, the grabrail is molded as an integral member from a thermoplastic material, such as fire-resistant polyamide. The presently preferred material has the following physical characteristics:

| | |
|---|---|
| Tensile Strength | 6,200 psi (42.7 Mpa) |
| Elongation | 44% |
| Flexural Modulus | 210,000 psi (1448 MPa) |
| Izod Impact Strength Notched | 16 ft/lb/in (854 J/m) |
| Mold Shrinkage (Flow Direction) ⅛" | 14 mils/in (14 mm/m) |
| Melting Point | 460° F. (238° C.) |
| Flammability Rating | UL94 V-O |

| -continued | |
| --- | --- |
| A.S.T.M. 162-75 | $I_s = 150$ max. |

In an existing embodiment in accordance with the present invention, the rail portion has a maximum dimension between flats designated "a" in FIG. 5 of 1 inch. The sides are inclined at an angle designated "b" from vertical in FIG. 5 of 30°. The rail portion, as shown in FIG. 3, has a maximum height $h_1$ at the aisle side of 5-15/16 inches and a maximum height at the wall side designated $h_2$ of 4-1/16 inches. The overall length of the grabrail designated $l_1$ is 29¾ inches. Base portion 32 has a maximum height $h_3$ of 0.65 inches and a maximum transverse dimension $t_1$ of 1 inch. All corners have a smooth radius, as shown in FIGS. 5 and 6, so that the sides and surfaces of the grabrail are joined along rounded edges. The typical radius is ¼ inch. Recess 44 has a maximum height $h_4$ of 0.18 inches and a maximum transverse dimension $t_2$ of 0.70 inches. As shown in FIG. 3, the aisle and wall fastening apertures 38 are spaced from the extreme ends of the base a distance $d_1$ of 2⅛ inches. The distance between the centerlines of the end apertures and the intermediate apertures 38 designated $d_2$ is 11.25 inches. Each of the recesses 44 has a typical length $l_2$ of 4¾ inches. The leading and trailing edges terminate a distance of ¾ inches ($d_3$) from the centerline of apertures 38.

The unique mass transportation seat and grabrail in accordance with the present invention eliminates problems heretofore experienced in the assembly of such seats. There is no longer a need to notch or cut seat covering material to permit insertion of grabrail portions into the seat frame. The grabrail is readily assembled from above through vandal-resistant fasteners which extend through the apertures. The multipoint attachment insures that the impact loading is sufficiently distributed so that the grabrail will not separate from the seat back. The grabrail will deflect and absorb energy upon impact to thereby reduce or minimize injury to the passenger. The grabrail also performs the compartmentalizing function preventing a passenger from flying over the top of the seat. The grabrail is not readily cut, slashed or ripped and is, therefore, vandal resistant. Further, the grabrail is stain and mark resistant and unaffected by harsh cleaning agents. This increases the ease with which the vehicle owner may maintain the seat. The grabrail presents an attractive surface finish and is readily colored to match the aesthetics of the vehicle interior. The grabrail is easily molded as a one-piece integral member employing controlled injection molding techniques.

In view of the foregoing description, those of ordinary skill in the art might envision various modifications which would not depart from the patentable concepts disclosed herein. Therefore, it is expressly intended that the true spirit and scope of the present invention be determined from the appended claims.

The embodiments of the invention in which an exclusive property or privilege is claimed are defined as follows:

1. A one piece, vandal resistant grabrail for a mass transportation seat that includes a seat portion and a seat back having an upper edge, the grabrail being releasably mounted on the upper edge of the seat back, the grabrail comprising an elongated resiliently deflectable base formed of a flexible, resilient material that extends across the upper edge of the seat back, a rail spaced above the base, and at least three legs extending downwardly from the rail and interconnecting the rail to the base, the legs including a pair of outer legs at opposite ends of the rail and an inner leg positioned between the outer legs, the base including a plurality of apertures therethrough at spaced intervals along the base, the apertures receiving fastener means for attaching the base securely to the upper edge of the seat back, the apertures including two outer apertures spaced apart from but closely adjacent to the respective outer legs and an inner aperture spaced apart from but closely adjacent to the side of the inner leg, the configuration of the base, with the base being resiliently deflectable and the apertures being spaced apart from the legs, permitting the grabrail to deflect upon impact to absorb energy and reduce deceleration loads, while at the same time causing the reduced deceleration loads to be distributed among the fasteners along the base so as to induce the base to remain firmly secured to the upper edge of the seat back even when the grabrail is deflected.

2. A grabrail according to claim 1 wherein the grabrail is integrally molded from a tough, resilient thermoplastic resin having sufficient flex, resiliency, and toughness properties such that the grabrail, without reinforcement, resists vandalism and causes the grabrail to remain firmly secured to the upper edge of the seat back even when the rail is subjected to deflective impact loads.

3. A grab rail according to claim 2 wherein the grabrail is formed of polyamide resin.

4. A grabrail according to claim 2 wherein the outer apertures are positioned about two and one-eigth (2⅛) inches inward from the outer end of the base with the outer legs joining the base at the outer edge of the base, the base including two inner apertures on opposite sides of the inner leg, the inner apertures being separated from each other by about three (3) inches.

5. A grabrail according to claim 4 wherein the base is about 0.65 inches high and about one (1) inch wide.

6. A grabrail according to claim 2 wherein the apertures are countersunk in the base, providing downwardly and inwardly tapered openings in the base, the fastener means comprising threaded fasteners that fit downwardly through the apertures into engagement with threaded openings in the upper edge of the seat back, the fasteners having tapered heads that mate with the countersunk openings and permit the fasteners to be inserted so as to be flush with the upper surface of the base.

7. A grabrail according to claim 1 wherein the base includes two inner apertures spaced apart from but closely adjacent to opposite sides of the inner leg.

* * * * *